(12) United States Patent
Barnes et al.

(10) Patent No.: US 9,235,455 B2
(45) Date of Patent: Jan. 12, 2016

(54) MULTI-CORE DISTRIBUTED PROCESSING USING SHARED MEMORY AND COMMUNICATION LINK

(75) Inventors: Danny S. Barnes, Maple Valley, WA (US); Serge H. Limondin, Milford, NH (US)

(73) Assignee: Microscan Systems, Inc., Renton, WA (US)

( * ) Notice: Subject to any disclaimer, the term of this patent is extended or adjusted under 35 U.S.C. 154(b) by 870 days.

(21) Appl. No.: 13/049,604

(22) Filed: Mar. 16, 2011

(65) Prior Publication Data
US 2012/0239905 A1    Sep. 20, 2012

(51) Int. Cl.
G06F 9/54 (2006.01)
(52) U.S. Cl.
CPC . *G06F 9/544* (2013.01); *G06F 9/54* (2013.01)
(58) Field of Classification Search
CPC .................................. G06F 9/544; G06F 9/54
USPC .......................................................... 712/29
See application file for complete search history.

(56) References Cited

U.S. PATENT DOCUMENTS

| | | | |
|---|---|---|---|
| 7,502,860 B1* | 3/2009 | Champagne ............ | H04L 47/10 370/252 |
| 2005/0182844 A1* | 8/2005 | Johnson et al. ............... | 709/230 |
| 2008/0126762 A1* | 5/2008 | Kelley et al. .................. | 712/225 |
| 2009/0006672 A1* | 1/2009 | Blumrich et al. .............. | 710/54 |
| 2010/0031328 A1 | 2/2010 | Hodgkinson | |
| 2010/0325583 A1* | 12/2010 | Aarni et al. .................... | 715/833 |
| 2011/0103711 A1* | 5/2011 | Su et al. ........................ | 382/276 |
| 2011/0124319 A1* | 5/2011 | Fu ............................ | H04L 67/02 455/414.1 |
| 2011/0225542 A1* | 9/2011 | Schmieder ............ | G06F 3/0481 715/794 |
| 2011/0246749 A1* | 10/2011 | Chen et al. ...................... | 712/35 |

FOREIGN PATENT DOCUMENTS

| | | |
|---|---|---|
| CN | 1405679 A | 6/2003 |
| CN | 101667138 A | 3/2010 |
| CN | 101901207 A | 12/2010 |
| EP | 1150208 A2 | 10/2001 |
| KR | 10-2010-0019010 A | 2/2010 |

OTHER PUBLICATIONS

Wind River VxWorks Platforms 3.8, Jan. 2010, Wind River Systems, pp. 1-30.*
PCT/US2012/027155—International Search Report and Written Opinion, mail date Sep. 20, 2012, 7 pages.

(Continued)

*Primary Examiner* — Andrew Caldwell
*Assistant Examiner* — Jyoti Mehta
(74) *Attorney, Agent, or Firm* — Blakely Sokoloff Taylor & Zafman LLP

(57) ABSTRACT

Embodiments of an apparatus including a first processor core having a local agent running thereon, the agent comprising a local process and a proxy agent and a second processor core having a remote agent running thereon, the remote agent being an instance of the local agent. A shared memory wherein coupled to the first processor core and the second processor core, wherein the local agent and the remote agent communicate via the shared memory. Other embodiments are disclosed and claimed.

28 Claims, 5 Drawing Sheets

(56) References Cited

OTHER PUBLICATIONS

CN 2012-80020357.5—First Chinese Office Action with English translation, issued Jun. 12, 2015, 15 pages.

KR 10-2013-7027168—Korean Office Action with English Translation, issued Nov. 27, 2014, 8 pages.

* cited by examiner

MULTI-CORE DISTRIBUTED PROCESSING USING SHARED MEMORY AND COMMUNICATION LINK

TECHNICAL FIELD

The present invention relates generally to data processing and in particular, but not exclusively, to multi-core distributed processing for machine vision applications.

BACKGROUND

Microprocessors using multiple cores have improved computing speeds for many applications, although not all applications benefit significantly from multi-core processing. For those types of application that do benefit from a multi-core implementation, the required code can be complex and difficult to maintain because of the need to communicate and coordinate between cores.

One implementation of multi-core software uses Remote Procedure Calls (RPCs) for communication and coordination among cores, but this approach has some shortcomings, notably the associated over-head and software complexity required for client and server cores to implement RPCs. Implementation of the RPC layer involves separating the code onto the two processors or cores, one of which is referred to as the client and the other as the server, and providing a layer to transparently connect the function calls between the client and server. This involves an RPC module on both cores and does not provide an easily maintainable or upgradeable architecture. Furthermore, transfer of data between the cores can consume processing time and memory bandwidth. Finally, in most RPC implementations there is no provision for the client to actively participate in the processing provided by the server, meaning that the processing is completely delegated to the server or remote routine.

BRIEF DESCRIPTION OF THE DRAWINGS

Non-limiting and non-exhaustive embodiments of the present invention are described with reference to the following figures, wherein like reference numerals refer to like parts throughout the various views unless otherwise specified.

DETAILED DESCRIPTION OF THE ILLUSTRATED EMBODIMENTS

Embodiments of a system and method for multi-core distributed processing for machine vision applications are described. Numerous specific details are described to provide a thorough understanding of embodiments of the invention, but one skilled in the relevant art will recognize that the invention can be practiced without one or more of the specific details, or with other methods, components, materials, etc. In some instances, well-known structures, materials, or operations are not shown or described in detail but are nonetheless encompassed within the scope of the invention.

Reference throughout this specification to "one embodiment" or "an embodiment" means that a particular feature, structure, or characteristic described in connection with the embodiment is included in at least one described embodiment. Thus, appearances of the phrases "in one embodiment" or "in an embodiment" in this specification do not necessarily all refer to the same embodiment. Furthermore, the particular features, structures, or characteristics may be combined in any suitable manner in one or more embodiments.

Figure 1:
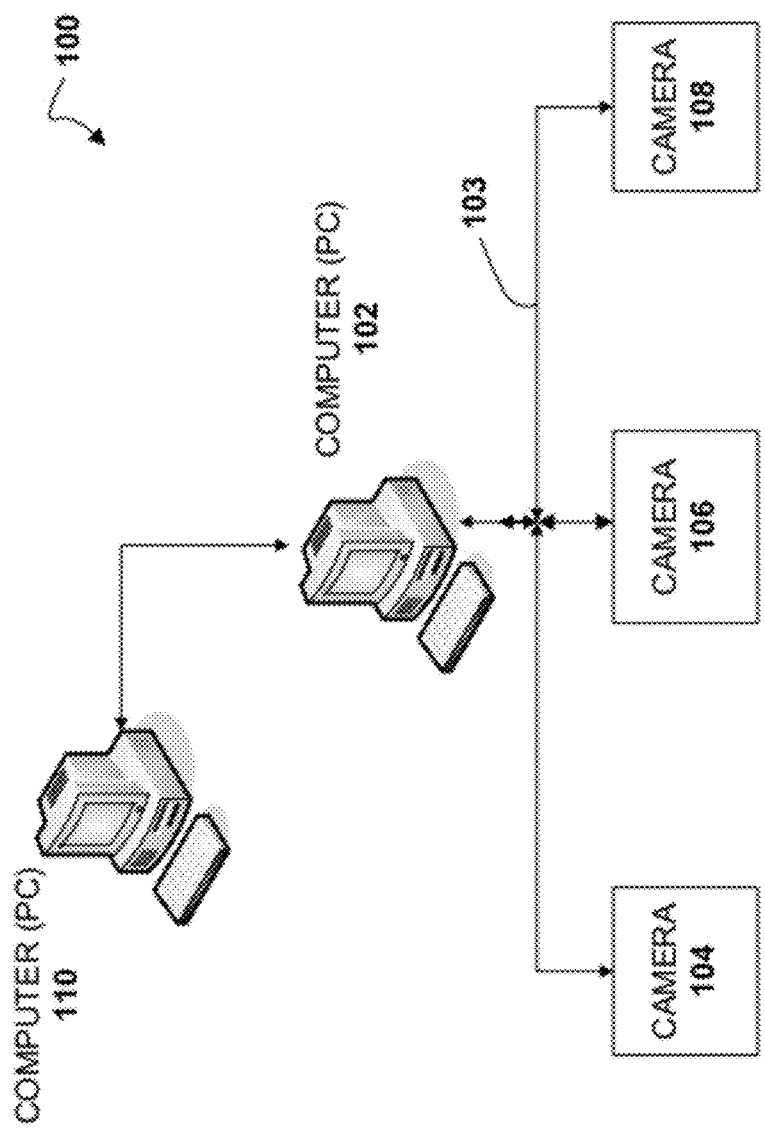
FIG. 1 is a block diagram of an embodiment of a machine-vision system.

FIG. 1 illustrates an embodiment of a machine-vision system 100. System 100 includes a computer 102, which in one embodiment can be a personal computer (PC) coupled via a bus 103 to multiple machine vision cameras 104, 106 and 108. In one embodiment computer 102 can additionally be coupled to another computer 110, for example via a network such as Ethernet or the Internet. In one embodiment, machine-vision cameras 104, 106 and 108 can be the same kind of camera, but in other embodiments the need not all be the same kind of camera. Machine-vision cameras 104, 106 and 108 can be a mix of cameras or smart cameras where the difference is that the processing of the camera images is done on the camera itself and not the computer the cameras are connected to. In still other embodiments, system 100 can include more or less cameras than the three illustrated.

Computer 102 can include memory, storage, a display, and a communication interface through which it can communicate with cameras 104-108 or with computer 110. Computer 110 can have similar elements, including a communication interface through which it can communicate with computer 102. Computers 102 and 110 each include a processor that the computer can use to perform operations on data it exchanges with other elements in the system such as machine vision cameras 104-108 or can perform image processing operations on the camera images directly. In one embodiment computers 102 and 110 each have a multi-core processor with two or more processor cores (see, e.g., FIG. 2). In another embodiment computers 102 and 110 can each have single-core processors, but by using the connection to computer 110, the single-core processors in computers 102 and 110 can be made to work together as if they were a single multi-core processor (see, e.g., FIG. 3). In still other embodiments, both computers 102 and 110 need not have the same type of processor; for instance, one can have a multi-core processor and the other a single core processor.

In operation, data such as images are captured by machine-vision cameras 104-108 and are transferred via bus 103 to one or both of computers 102 and 110 for processing. The image data, which in one embodiment can be two-dimensional images, can be split up for processing in various ways depending on the configuration of the processors in computers 102 and 110. In an embodiment where computer 102 has a multi-core processor and will be expected to do all image processing, individual images can be split up, with one core processing one part of the image and the other core processing another part of the image. In another embodiment, each core can perform a different processing task on the entire image. Tasks can be similarly split up in an embodiment where computers 102 and 110 are coupled to form a multi-core processor (see, e.g., FIG. 3).

Figure 2:
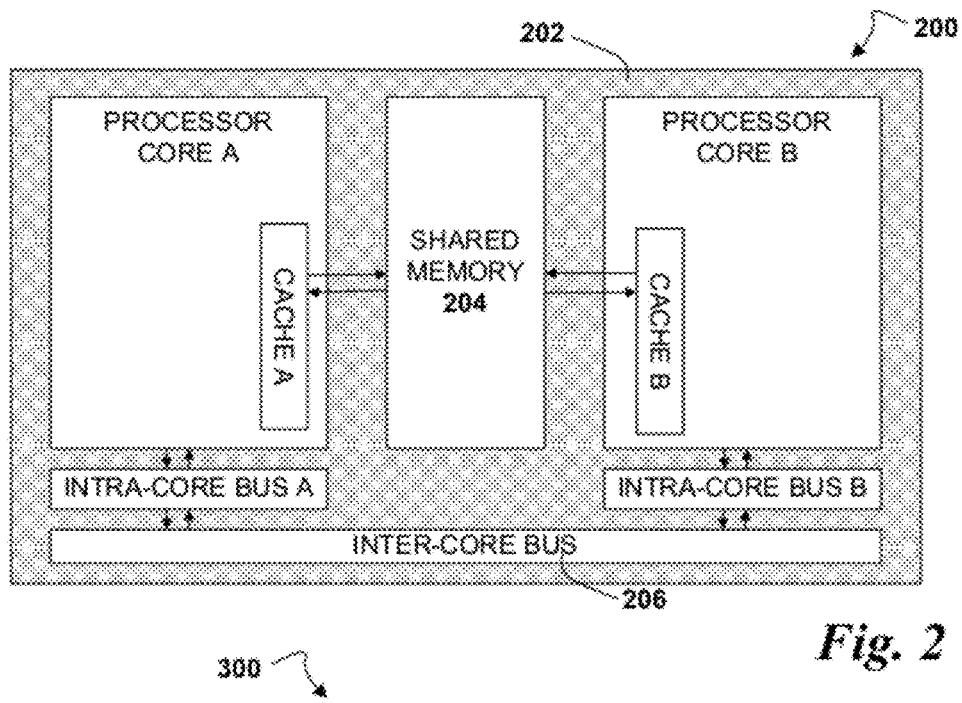
FIG. 2 is a block diagram of an embodiment of a multi-core processor.

FIG. 2 illustrates an embodiment of a multi-core processor 200. Processor 200 is formed on a single substrate 202 and includes two processor cores: first core A and second core B. Each processor core includes a memory cache—cache A for core A, cache B for core B—and both processors are coupled, via their respective caches, to a shared memory 204, which in the illustrated embodiment is on-board memory but in other embodiments can be external to processor 200. Cores A and B can then read and write data to shared memory 204 via their caches. Each processor core is also coupled to its own intra-core bus—intra-core bus A for core A, and intra-core-bus B for core B. The intra-core buses provide communication between elements within the same processor core. Intra-core buses A and B are in turn coupled to inter-core bus 206, which provides communication between core A and core B as well as with other elements outside of processor 200, such as a communication interface through which processor 200 can receive and transmit data including image data coming from a camera sensor, for example from a machine-vision camera. In one embodiment processor 200 can be homogeneous, meaning that both cores A and B are the same type of processor, but in other embodiments processor 200 can be heterogeneous, meaning that cores A and B are different types of cores. For example, in one heterogeneous embodiment core A can be an Advanced RISC Machine (ARM) core while core B can be a digital signal processor (DSP) core. Moreover, the illustrated embodiment of processor 200 has two cores, but in other embodiments processor 200 can have more than two cores.

In operation of processor 200, cores A and B each execute code (objects, processes, threads, etc.) that cause the cores to act upon data received at the processor. The processing tasks assigned to each core can vary depending on the nature of the application in which processor 200 will be used and on the nature of the data to be processed. For example, in an embodiment in which processor 200 is used in a machine vision system such as system 100, each image received from a machine-vision camera can be split up and each part of the image processed by a different core. Alternatively, each core can do a different processing task on a whole image, or each image can be sent to its own core so that each core does the entire processing on an image.

During operation, cores A and B read from and write to shared memory 204 via their respective caches. If the tasks running on cores A and B are independent, then cores A and B can read and write to different parts (i.e., different address blocks) of shared memory 204, but if the tasks are not independent then cores A and B can read and write to the same parts (i.e., the same block of memory addresses) of shared memory 204. In essence, then, when both cores use the same parts of shared memory 204, the shared memory can provide a direct communication channel between the cores. During operation, elements with each core can communicate using communication channels within the processor core or using each core's respective intra-processor bus. If communication between cores A and B is needed during operation, the cores can also communicate via inter-core bus 206.

Figure 3:
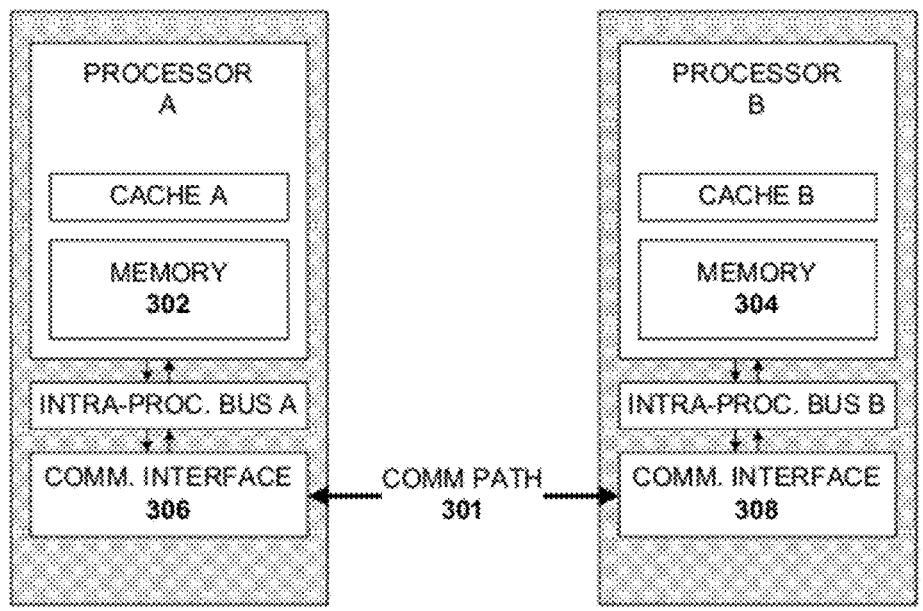
FIG. 3 is a block diagram of an alternative embodiment of a multi-core processor.

FIG. 3 illustrates an alternative embodiment of a multi-core processor 300. Unlike processor 200, processor 300 is not formed on a single substrate, but instead includes a pair of separate single-core processors coupled so that together they form a multi-core processor. In multi-core processor 300, then, each separate single-core processor is considered a processor core. In one embodiment processor 300 can be homogeneous, meaning that both processor A and B are the same type of processor, but in other embodiments processors A and B can be different types of processors. For example, in one embodiment processor A can be an Advanced RISC Machine (ARM) core while processor B can be a digital signal processor (DSP) core. Moreover, the illustrated embodiment of processor 300 has two cores (processors), but in other embodiments processor 300 can have more than two cores. In still other embodiments, both processors A and B need not have the same number of cores; for instance, one can be a multi-core processor and the other a single core processor.

Multi-core processor 300 includes two processor cores: first processor A is the first processor core and second processor B is the second processor core. Each processor includes a memory cache—cache A for processor A, and cache B for processor B. Processor A is coupled via its respective cache to a memory 302, and processor B is coupled via its respective cache to a memory 304. Each processor is also coupled to its own intra-core bus—intra-core bus A for processor A, and intra-core-bus B for processor B. The intra-core buses provide communication between elements within the same processor. Intra-core buses A and B are in turn coupled to corresponding communication interfaces—interface 306 for processor A and interface 308 for processor B. The communication interfaces enable communication between processor A and processor B via a communication path 301 using some kind of communication protocol. In one embodiment communication path 301 can be a hard-wired connection, but in other embodiments it could be a wireless connection and in still other embodiments it can be some combination of hard-wired and wireless connection. In different embodiments, the communication protocol used by communication interfaces 306 and 308 and communication path 301 can be Ethernet, TCP/IP, or some other communication protocol.

In operation of processor 300, processors A and B each execute code (objects, processes, threads, etc.) that cause the cores to act upon data. The tasks assigned to each core can vary depending on the types of processors A and B, the nature of the application in which processor 300 will be used and the nature of the data to be processed. For example, in an embodiment in which processor 300 is used in a machine vision system such as system 100, each image received from a machine-vision camera can be split up and each part of the image processed by a different processor. Alternatively, each core can do a different processing task on a whole image, or each image can be sent to its own core so that each core does the entire processing on an image.

During operation, if the tasks running on processors A and B are independent, then cores A and B can read and write to their own respective memories 302 and 304, but if there are data dependencies then processor 300 can be set up so processors A and B can read and write to a shared memory. In one embodiment the shared memory can be one of the existing memories 302 or 304, in which case one processor reads and writes to its own memory and the other processor reads and writes from that same memory via communication path 301. In another embodiment, a third memory (not shown) could be used as a shared memory, so that cores A and B would both read and write from the shared memory via a communication link such as communication link 301. During operation, elements within each of processors A and B can communicate using channels within the processor core or using each core's respective intra-processor bus.

Figure 4A:
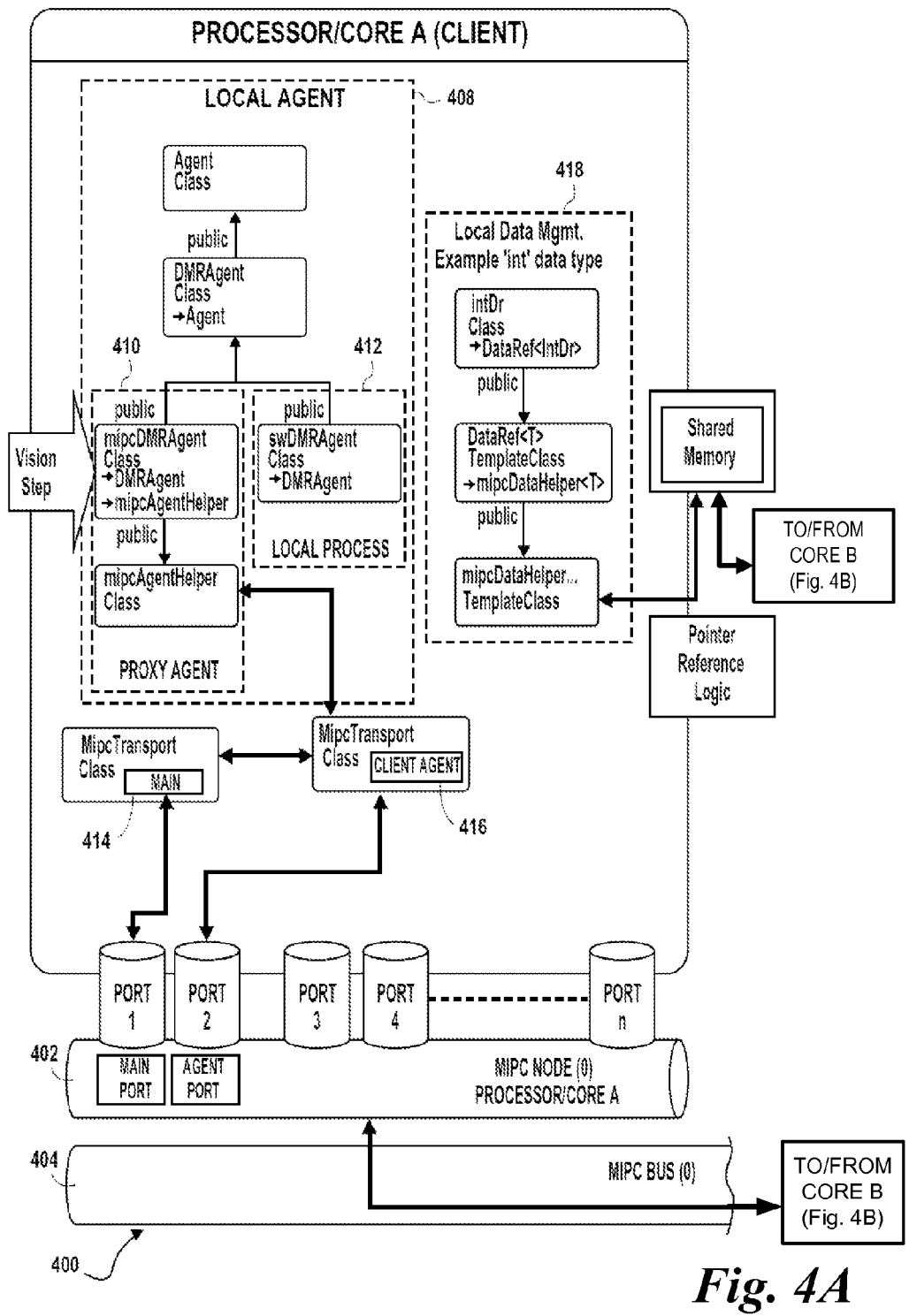
FIGS. 4A-4B together are a block diagram of an embodiment of a software architecture for a multi-core processor.
Figure 4B:
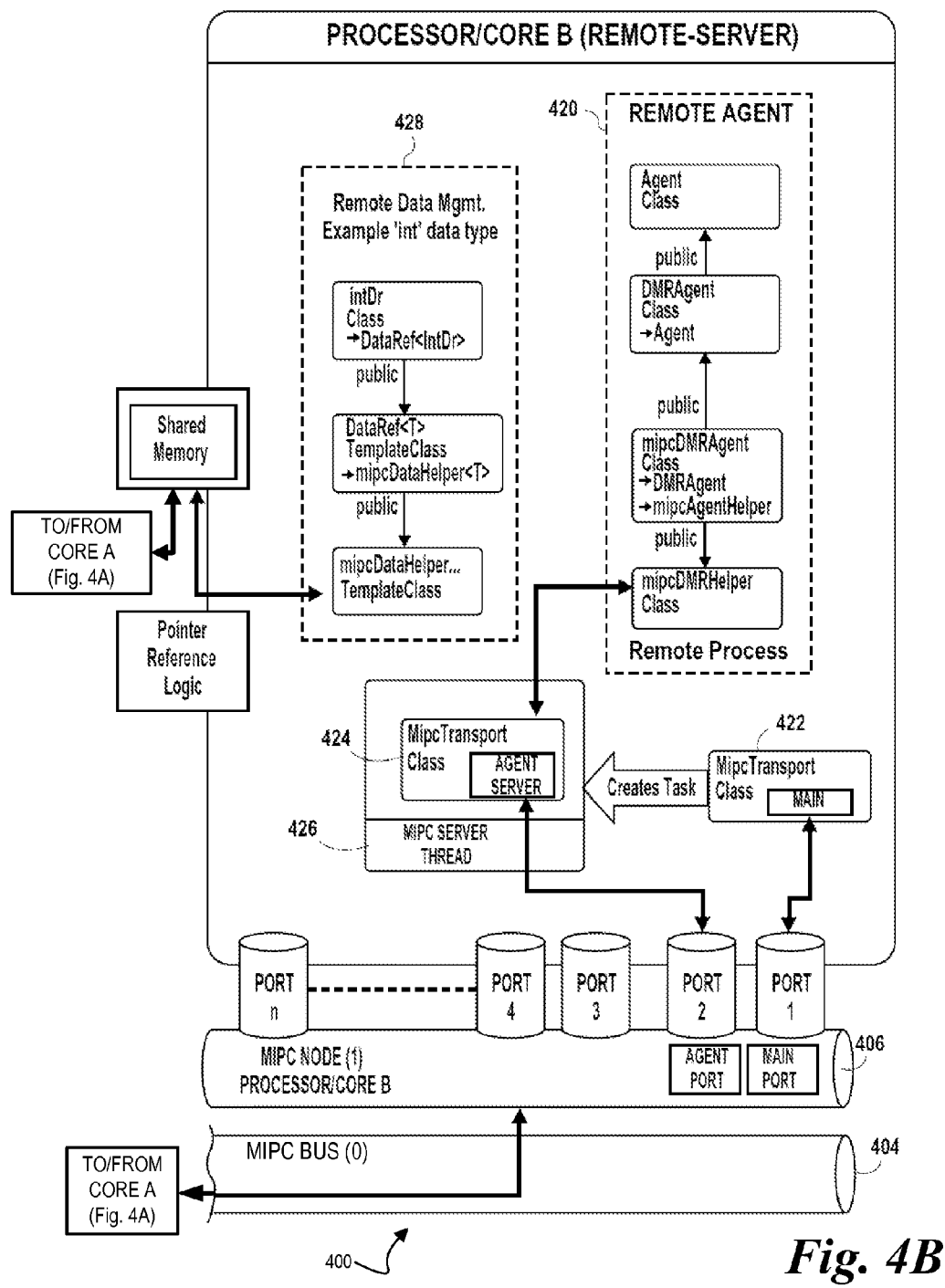

FIGS. 4A-4B together illustrate an embodiment of a software architecture 400 that can be used in a multi-core processor such as multi-core processors 200 and 300. Software architecture 400 is implemented on a pair of processor cores: core A (shown in FIG. 4A), which will be referred to as the local or client core; and core B (shown in FIG. 4B), which will be referred to as the remote or server core. The illustrated embodiment shows an architecture for a two-core processor such as processor 200, but in other embodiments the architecture can be extended to any number of processors and in still other embodiments it can be adapted to function on a multi-core processor such as processor 300.

Core A includes an intra-core communication bus 402, while core B includes an intra-core communication bus 406. The intra-core communication buses can be used for communication between elements in the same core. Both intra-core communication buses 402 and 406 are in turn coupled to inter-core bus 404, which can be used for communication between core A and core B. In the illustrated embodiment, the transport protocol for intra-core communication buses 402 and 406 and inter-core communication bus 404 is the Multi-OS Inter-Process Communication (MIPC) protocol of the vxWorks operating system, developed by Wind River Systems of Alameda, Calif., USA. Wind River Systems is now part of Intel Corporation of Santa Clara, Calif. In other embodiments, other communication protocols can be used.

Each intra-core communication bus includes N ports that complete the connection between the cores. In different embodiments the different ports can be assigned for specific tasks. For example, in an embodiment of a machine vision system the ports could be assigned as follows:

Port Function
Port 0: Unused.
Port 1: Main (running on highest priority thread on processor/core B).
Port 2: Image Acquisition.
Ports 3-n: Vision Agent Distributed Processing.

| Port | Function |
| --- | --- |
| Port 0: | Unused. |
| Port 1: | Main (running on highest priority thread on processor/core B). |
| Port 2: | Image Acquisition. |
| Ports 3-n: | Vision Agent Distributed Processing. |

Once a MIPC port connection is established between the cores it will never actually be disconnected. Rather if the task that is using the port is removed, the port will become available for use by another task. In one embodiment the PORT states are defined below:

INACTIVE: port connection between cores has not been established.
CONNECTED: port connection between cores has been established but the port is available.
ACTIVE: port connection established and PORT is currently in use.

Within core A are running various processes, including a local agent 408 and a local data management process 418. Also running within core A are a main transport agent 414 and a client transport agent 416. Local agent 408 is an agent that processes data; in a machine-vision embodiment of architecture 400, local agent 408 would be the code that processes image data from a machine-vision camera. Local agent 408 includes a local process 412 and a proxy agent 410. Local process 412 handles the local processing carried out by local agent 408 on core A, while proxy agent 410 transfers processing requests to remote agent 420 running on core B. In one embodiment, proxy agent 410 can offer the same interface as remote agent 420 and will transfer some of the operation requests to the remote agent while still retaining some operation requests for itself.

Local data management process 418 reads and writes to the shared memory (see FIG. 2) during operation of architecture 400. In one embodiment, data management process 418 uses data type classes that provide the ability to read and write to memory using re-directed pointer logic, so that it provides a methodology for the cores to re-direct data flow so that the agents will write/update data for the appropriate processor core. This allows local agent 408 and remote agent 420 to function as if they were one as viewed by the step client. It also allows both agents to transparently read and write data to one another as if there was a single copy of data, as would be the case for a single core implementation. This is accomplished by utilizing a data reference template class to be used as a base class for the local and remote agent native types. Local data management process 418 also manages the cache coherency of the cache on core A, providing cache invalidate and cache flush instructions depending on the dataflow direction.

In one embodiment, local data management process 418 uses re-directed pointer logic, in which the proxy agent 410 will re-direct the input types pointer reference to point to the remote agent data location and the remote agent will re-direct the output types pointer reference to the local agent data location. With the re-directed pointer logic, both the local agent and remote agent write to the same block of memory addresses in the shared memory as remote data management process 428, such that the shared memory provides run-time communication between cores and no data needs to be transferred between cores, allowing for a streamlined and fast process.

Main transport process 414 and client transport process 416 handle communication among the processes running on core A, as well as communication between processes on core A and certain processes on core B or outside the processor altogether. Main transport process 414 communicates with the main port of intra-core bus 402 and with client transport process 416. Client transport process 416 in turn communicates with main transport process 414, the agent port of intra-core bus 402, and proxy agent 410.

Core B runs various processes that substantially mirror the processes running in core A. In one embodiment, all the processes can be performed by either core, so there are consequently two versions of all of the software objects and methods that can be instantiated or constructed on either core. Processes running in core B include a remote agent 420 and a remote data management process 428. Also running within core B are a main transport agent 422 and a server transport agent 424. Remote agent 420 is an agent that processes data; in a machine-vision embodiment of architecture 400, remote agent 420 would be the code that processes image data from a machine-vision camera. Remote agent 420 comprises substantially the same code as local agent 408, and when running is substantially another instance of local agent 408, except that the remote agent 420 does not spawn a local process like local process 412.

Similarly to core A, core B runs a remote data management process 428. As with remote agent 420, remote data management process 428 comprises substantially the same code as local data management process 418, and when running is substantially another instance of local data management process 418. Remote data management process 428 also manages the cache coherency of the cache on core B, providing cache invalidate and cache flush instructions depending on the dataflow direction. In one embodiment, remote data management process 428, as described above, uses re-directed pointer logic and writes to the same block of memory addresses in the shared memory as local data management process 418 such that the shared memory provides run-time communication between cores.

Main transport process 422 and server transport process 424 can handle communication among the processes running on core B, as well as communication between the processes on core B and the processes on core A or elsewhere. Main transport process 422 communicates with the main port of intra-core bus 406 and with client transport process 424. Server transport process 424 in turn communicates with main transport process 422, the agent port of intra-core bus 406, and remote agent 420. In one embodiment, the transport processes are used during setup of the remote processes on core B as well as during initiation of the remote agent 420 processing and upon completion, transmitting an End signal to proxy agent 410, leaving the shared memory as the primary means of runtime communication between cores.

In operation of architecture 400, the relevant processes are first set up (see FIG. 5) in cores A and B. Core A receives relevant data via the appropriate processes—image data from a machine vision camera, for example—and stores the data in shared memory (see, e.g., FIG. 2). Local agent 408 begins its part of processing the data in the shared memory and causes proxy agent 410 to transmit a Go command to remote agent 420 via the intra- and inter-core buses, causing remote agent 428 to also begin its part of the processing of the data in the shared memory. In one embodiment, after proxy agent 410 transmits the Go command, the local and remote agents have no further communication via the intra- and inter-core buses until completion of processing, when the remote agent 428 will send an End signal to proxy agent 410, instead using local data management process 418 and remote data management process 428 to communicate primarily or exclusively through the shared memory. As discussed above, to enable this communication the local and remote data management processes read and write from the same block of memory addresses within the shared memory and, in one embodiment, they do so using re-directed pointer logic.

When remote agent 420 has completed its tasks, it signals completion by sending an End signal to proxy agent 410 via the intra- and inter-core buses. Remote agent 420 then enters a wait state and waits for a further Go command from the proxy agent if and when further processing is necessary. When both remote agent 420 and local agent 408 have completed their processing, the processed data can be read from the shared memory and transmitted elsewhere for display, storage, or further processing.

Figure 5:
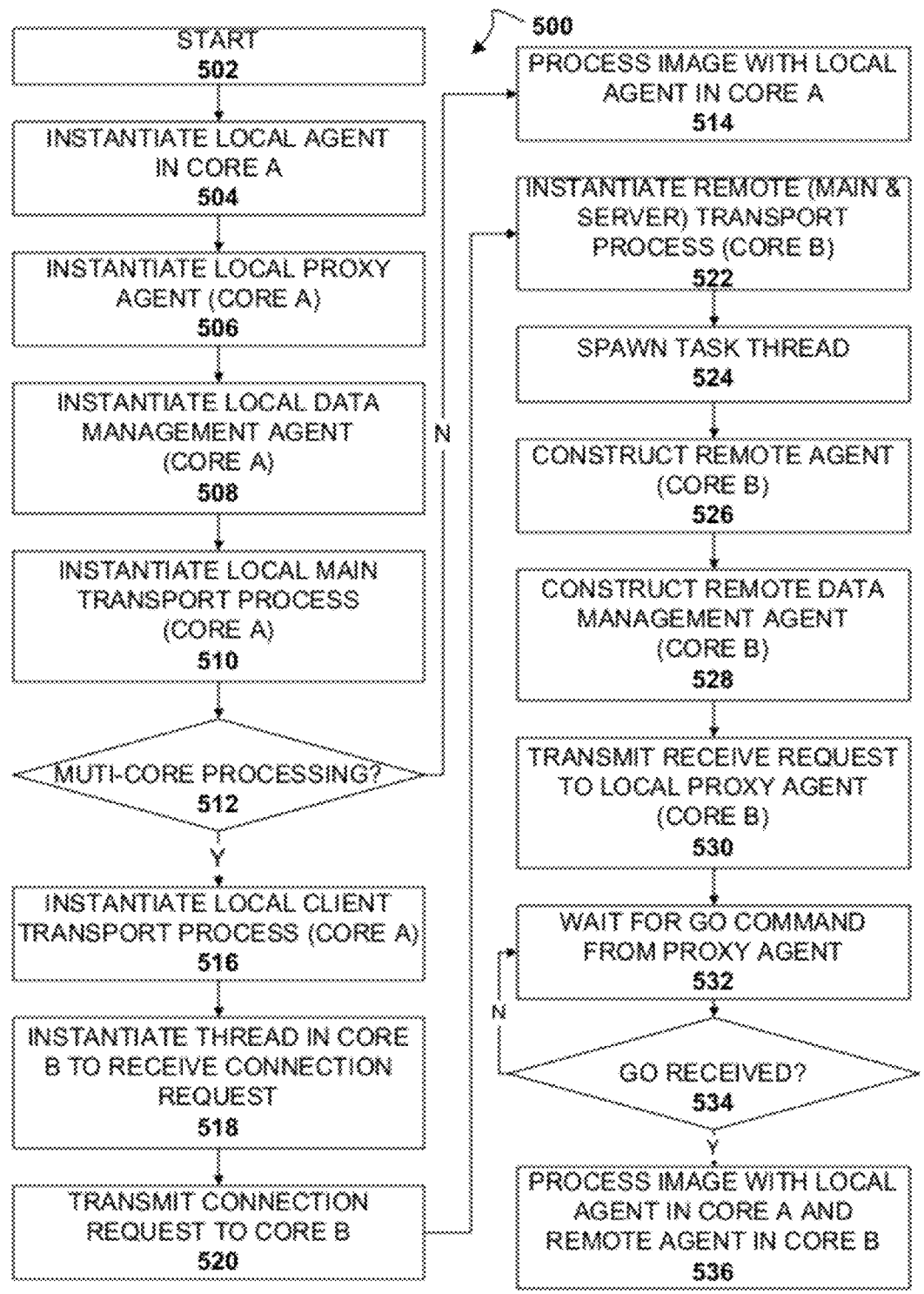
FIG. 5 is a flowchart of an embodiment of a process for implementing the software architecture shown in FIG. 4.

FIG. 5 illustrates an embodiment of a process for implementing the software architecture illustrated in FIG. 4. The process starts at block 502. At block 504, the process determines whether the local agent 408 to be created is a local process 412 or a distributed process utilizing a proxy agent 410. If the process is to be performed locally, then the local agent 408 is constructed or derived using the local process 412 in core A. If the process is to be distributed, then at block 506 the local agent 408 is constructed or derived using the proxy agent 410 in core A. Local data management process 418 is instantiated at block 508 and main transport process 414 is instantiated at block 510.

At block 512, the process checks whether multi-core processing will be performed. If no multi-core processing will be performed, then the process goes to block 514, where all processing takes place using the processes that are running in block 514. If multi-core processing will take place, then at block 516 local client transport process 416 is instantiated in core A, and at block 518 client transport process 416 uses intra-core buses 402 and 406 and inter-core bus 404 to instantiate a thread in core B to receive a connection request. At block 520, client transport process 416 sends a connection request to core B.

At block 522, the process instantiates main transport process 422 in core B upon receiving a request from the local agent 408, and main transport process 422 then instantiates server transport process 424. At block 524 server transport process 424 spawns a task thread 426, and at block 526 the remote agent 420 is constructed. At block 528, remote data management process 428 is constructed.

At block 530, after all the necessary processes are started, remote agent 420 transmits a receive request to local proxy agent 410 to tell the proxy agent that it is ready. At block 532, remote agent 420 waits to receive a Go command from local proxy agent 410 to tell it to start processing. At block 534, the process checks whether the Go command has been received. If it has not the process returns to block 532, otherwise the process goes to block 536, where multi-core processing begins.

Embodiments of the disclosed invention provide a software model that provides minimal data transfer between the processing cores, as data flow is managed via data type classes that provide the ability to re-direct pointers. In addition, both cores contain the vision processing software, where one has a proxy implementation and the other has a remote implementation. This allows for both processors to use the same code base and to have minimal code overhead associated with the Remote Procedure Call (RPC) layer. Contrary to most RPC implementations, both local and remote objects actively participate in processing, therefore acting as both client and server to the other object transparently. Addition of new Distributed Vision Processing tasks is a simple matter as the architecture can be replicated. Furthermore this architecture can be extended to remote architectures that do not share the same memory address space as the client, for example over an Ethernet network.

The above description of illustrated embodiments of the invention, including what is described in the abstract, is not intended to be exhaustive or to limit the invention to the precise forms disclosed. While specific embodiments of, and examples for, the invention are described herein for illustrative purposes, various equivalent modifications are possible within the scope of the invention, as those skilled in the relevant art will recognize. These modifications can be made to the invention in light of the above detailed description.

The terms used in the following claims should not be construed to limit the invention to the specific embodiments disclosed in the specification and the claims. Rather, the scope of the invention is to be determined entirely by the following claims, which are to be construed in accordance with established doctrines of claim interpretation.

The invention claimed is:

1. An apparatus comprising:
   a first processor core running:
      a local agent comprising a local process and a proxy agent, and
      a local main transport process that instantiates a local transport agent, wherein the local transport agent communicates with the local main transport process, the proxy agent, and a remote transport agent;
   a second processor core running:
      a remote agent that is an instance of the local agent, and
      a remote main transport process that instantiates the remote transport agent, wherein the remote transport agent is an instance of the local transport agent and communicates with the remote agent;
   a memory coupled to the first processor core and the second processor core, wherein at runtime the local agent and the remote agent reads from and writes to the same block of memory addresses in the memory; and
   a communication link between the first processor core and the second processor core, wherein the proxy agent instantiates the remote main transport process via the communication link, and wherein the remote transport agent instantiates the remote agent.

2. The apparatus of claim 1 wherein the communication link is a Multi-OS Inter-Process Communication (MIPC) transport.

3. The apparatus of claim 1 wherein the first processor core is different than the second processor core.

4. The apparatus of claim 3 wherein the first processor core is an Advanced RISC Machine (ARM) processor and the second processor core is a digital signal processor (DSP).

5. The apparatus of claim 1 wherein the first processor core has a local data management process running thereon, the second processor core has a remote data management process running thereon, and the local and remote data management processes manage data exchange via the same block of memory addresses in the memory.

6. The apparatus of claim 5 wherein the local and remote data management processes use re-directed pointer logic to manage data exchange via the same block of memory addresses in the memory.

7. The apparatus of claim 6 wherein the local and remote agents read from and write to the same block of memory addresses in the memory via the local and remote data management processes.

8. The apparatus of claim 5 wherein the first processor core includes a first cache whose cache coherency is managed by the local data management process and the second processor core includes a second cache whose cache coherency is managed by the remote data management process.

9. The apparatus of claim 1 wherein the memory is the exclusive runtime communication means between the first processor core and the second processor core.

10. The apparatus of claim 1 wherein the communication link comprises:
a first intra-core bus communicatively coupled to the first processor core;
a second intra-core bus communicatively coupled to the second processor core; and
an inter-core bus communicatively coupled to the first and second intra-core buses.

11. The apparatus of claim 10 wherein the local main transport process and the local transport agent are communicatively coupled to the first intra-core bus and the remote main transport process and the remote transport agent are communicatively coupled to the second intra-core bus.

12. The apparatus of claim 11 wherein the local transport agent can communicate with an agent port of the first intra-core bus and the local main transport process can communicate with a main port of the first intra-core bus.

13. The apparatus of claim 12 wherein the remote transport agent can communicate with an agent port of the second intra-core bus and the remote main transport process can communicate with a main port of the second intra-core bus.

14. The apparatus of claim 1 wherein the remote transport agent spawns a thread to instantiate the remote agent.

15. A process comprising:
on a first processor core, running:
a local agent comprising a local process and a proxy agent, and
a local main transport process that instantiates a local transport agent, wherein the local transport agent communicates with the local main transport process, the proxy agent, and a remote transport agent;
on a second processor core, constructing and running:
a remote agent that is an instance of the local agent, and
a remote main transport process that instantiates the remote transport agent, wherein the remote transport agent is an instance of the local transport agent and communicates with the remote agent;
communicating, at runtime, between the local agent and the remote agent via a block of memory addresses in a memory coupled to the first processor core and the second processor core; and
communicating using a communication link between the first processor core and the second processor core, wherein constructing the remote agent comprises using the proxy agent to instantiate the remote main transport process via the communication link, and using the remote transport agent to instantiate the remote agent.

16. The process of claim 15 wherein the communication link is a Multi-OS Inter-Process Communication (MIPC) transport.

17. The process of claim 15 wherein the first processor core is different than the second processor core.

18. The process of claim 17 wherein the first processor core is an Advanced RISC Machine (ARM) processor and the second processor core is a digital signal processor (DSP).

19. The process of claim 15, further comprising:
running a local data management process on the first processor core; and
running a remote data management process on the second processor core, wherein the local and remote data management processes manage communication via the same block of memory addresses in the memory.

20. The process of claim 19 wherein the local and remote data management processes use re-directed pointer logic to communicate via the same block of memory addresses in the memory.

21. The process of claim 20 wherein the local and remote agents read from and write to the same block of memory addresses in the memory via the local and remote data management processes.

22. The process of claim 19 wherein the first processor core includes a first cache whose cache coherency is managed by the local data management process and the second processor core includes a second cache whose cache coherency is managed by the remote data management process.

23. The process of claim 15 wherein the memory is the exclusive runtime communication means between the first processor core and the second processor core.

24. The process of claim 15 wherein the communication link comprises:
a first intra-core bus communicatively coupled to the first processor core;
a second intra-core bus communicatively coupled to the second processor core; and
an inter-core bus communicatively coupled to the first and second intra-core buses.

25. The process of claim 24 wherein the local main transport process and the local transport agent are communicatively coupled to the first intra-core bus and the remote main transport process and the remote transport agent are communicatively coupled to the second intra-core bus.

26. The process of claim 25 wherein the local transport agent can communicate with an agent port of the first intra-core bus and the local main transport process can communicate with a main port of the first intra-core bus.

27. The process of claim 26 wherein the remote transport agent can communicate with an agent port of the second intra-core bus and the remote main transport process can communicate with a main port of the second intra-core bus.

28. The process of claim 15 wherein the remote transport agent spawns a thread to instantiate the remote agent.

* * * * *